United States Patent [19]

Forte et al.

[11] 4,167,973

[45] Sep. 18, 1979

[54] PROCESS FOR CHEMICAL DECONTAMINATION OF LAYERS OF EARTH AND/OR WATER CONTAMINATED WITH ORGANIC MATERIALS

[75] Inventors: Ernst Forte; Heinrich Schulthess, both of Sierre, Switzerland

[73] Assignee: Aquatechnique Sierre S.A., Chippis, Switzerland

[21] Appl. No.: 805,454

[22] Filed: Jun. 10, 1977

[30] Foreign Application Priority Data

Mar. 22, 1977 [CH] Switzerland ........................ 3587/77

[51] Int. Cl.$^2$ ........................ E21B 43/22; C02B 1/36; C02B 1/38
[52] U.S. Cl. ................................. 166/267; 166/75 R; 210/62; 210/63 Z; 210/170
[58] Field of Search ................... 166/244 R, 246, 250, 166/265, 266, 267, 311, 75 R; 210/62, 63 Z, 63 R, 64, 170

[56] References Cited

U.S. PATENT DOCUMENTS

| | | | |
|---|---|---|---|
| 2,055,808 | 9/1936 | Wait | 210/63 Z |
| 2,606,150 | 8/1952 | Thorp | 210/63 Z |
| 2,771,416 | 11/1956 | Ryan | 210/63 Z X |
| 2,786,529 | 3/1957 | Parsons | 166/266 |
| 3,022,247 | 2/1962 | Selby et al. | 210/170 X |
| 3,326,747 | 6/1967 | Ryan et al. | 210/62 X |
| 3,628,607 | 12/1971 | Dietz | 166/305 R |
| 3,649,533 | 3/1972 | Reijonen et al. | 210/170 X |
| 3,956,124 | 5/1976 | Fast et al. | 210/170 X |

Primary Examiner—Stephen J. Novosad
Assistant Examiner—George A. Suchfield
Attorney, Agent, or Firm—Cushman, Darby & Cushman

[57] ABSTRACT

There is provided an apparatus for the chemical decontamination of layers of earth and/or water contaminated with organic materials comprising the following block units:

- device for withdrawal of water from a water pressure line which water is to be treated and returned into the layers of earth,
- a mixing device for the preparation of a mixture of water and at least one strong, chemical oxidizing agent and/or bactericide,
- a degassing device for removal of excess gas from the mixture,
- a distribution device for distributing the mixture to several feed lines, and
- several mobile sprinkling and/or feeding lines with drain pipes to feed the aqueous mixture to and/or the layers of earth whereby the drain pipes are at most lowered to the still water level in the water bearing layers of ground.

There is also described a method of using the apparatus.

26 Claims, 2 Drawing Figures

PROCESS FOR CHEMICAL DECONTAMINATION OF LAYERS OF EARTH AND/OR WATER CONTAMINATED WITH ORGANIC MATERIALS

BACKGROUND OF THE INVENTION

The present invention is directed to an apparatus for the decontamination of layers of earth contaminated with organic materials as well as with correspondingly polluted water.

In this connection the decontamination includes both special undesired chemical compounds such as poisons as well as all common organic compounds which negatively injure the biological, chemical-physical and hydrogeological equilibrium of the layers of earth. Examples of such compounds are petroleum and its derivatives. In such a contamination there is also negatively influenced the oxygen content of the land and the ground water and the solubility of iron and manganese salts is increased.

The contamination also can be a result of a natural degradation of the water bearing land caused by hydrogeological influences of the surrounding environment or the drainage basin.

At present there are no true decontamination apparatuses known for maintaining and restoring the normal conditions of layers of earth and/or water contaminated with organic materials. These problems until today were chiefly handled by means of mechanical or thermal methods. The chief methods and apparatuses employed thereby are as follows:

Putting out of operation the pumped wells or springs.

Dredging the surrounding material of the water container by means of conventional dredges and eventually refilling the hole with non-objectionable material. The machines employed for this are very expensive and consequently very dear, besides the hydrogeological equilibrium of the region can be sensitively disturbed by the dredging.

Evaporating of the surrounding material by means of fixedly installed or mobile steam generators; this is only conceivable as a single method of operation, there can naturally be no question of continuous use.

SUMMARY OF THE INVENTION

The apparatus of the invention for the chemical decontamination of layers of earth contaminated with organic materials and/or correspondingly polluted water is characterized by the following block units:
  device for withdrawal of water from a water pressure line which water is to be treated and to be returned to the layers of earth,
  a mixing device for the preparation of a mixture of water and at least one strong, chemical oxidizing agent and/or bactericide,
  a degassing device for removal of excess gas from the mixture,
  a distribution device for distributing the mixture to several feed lines, and
  several mobile sprinkling and/or feeding lines with drain pipes to feed the aqueous mixture to and/or in the layers of earth whereby the drain pipes are at most lowered to the still water level in the water bearing layers of the ground.

In addition to the apparatus there is also included and claimed in the invention a method for operating the same. This is characterized by the ability to adjust the operation of the plant to a high degree for different demands. The units can for example be operated continuously or discontinuously, they can be operated under pressure or without pressure, they can be adjusted to new operating conditions by increase of the reaction or change of the content of oxidizing agents and/or bactericides and above all the mobile feeding lines can be inserted and fitted according to the extent and type of contamination.

The mixing can be carried out by dissolving the oxidizing agent and/or the bactericides in water, by emulsions of such materials in water and also by physical and chemical saturation of the water with gaseous oxidizing agents and/or bactericides. The oxidizing agent for example can be one of the known inorganic oxidizing agents, e.g., ozone, halogens, e.g., chlorine, hydrogen peroxide or others. As bactericides there can be added, e.g., silver ions, for example as silver nitrate.

In case the addition of the oxidizing agent and/or the bactericide occurs in the gaseous condition either in pure form or admixture with other gases, for example air, attention should be paid that the mixture is degassed before introduction of thr same into the protection zone.

As pointed out above, the apparatus of the invention can be driven under pressure from the introduction of the water up to distribution. In this case the mixing apparatus can be for example an ejector apparatus. After the distribution however, the mixture can be led either under pressure or without pressure to the layers of earth to be treated.

As stated above, the apparatus of the invention can be driven either continuously or discontinuously, for example periodically. Likewise there is included a regulating manner of operation wherein the water is analyzed and according to the analytical results the plant is operated or not.

This apparatus can be installed prophylactically before the water containing plant or tank plant or also can be installed after the completion of such water containing apparatus or tank. Likewise the apparatus can be installed after an accident.

Figure 1:
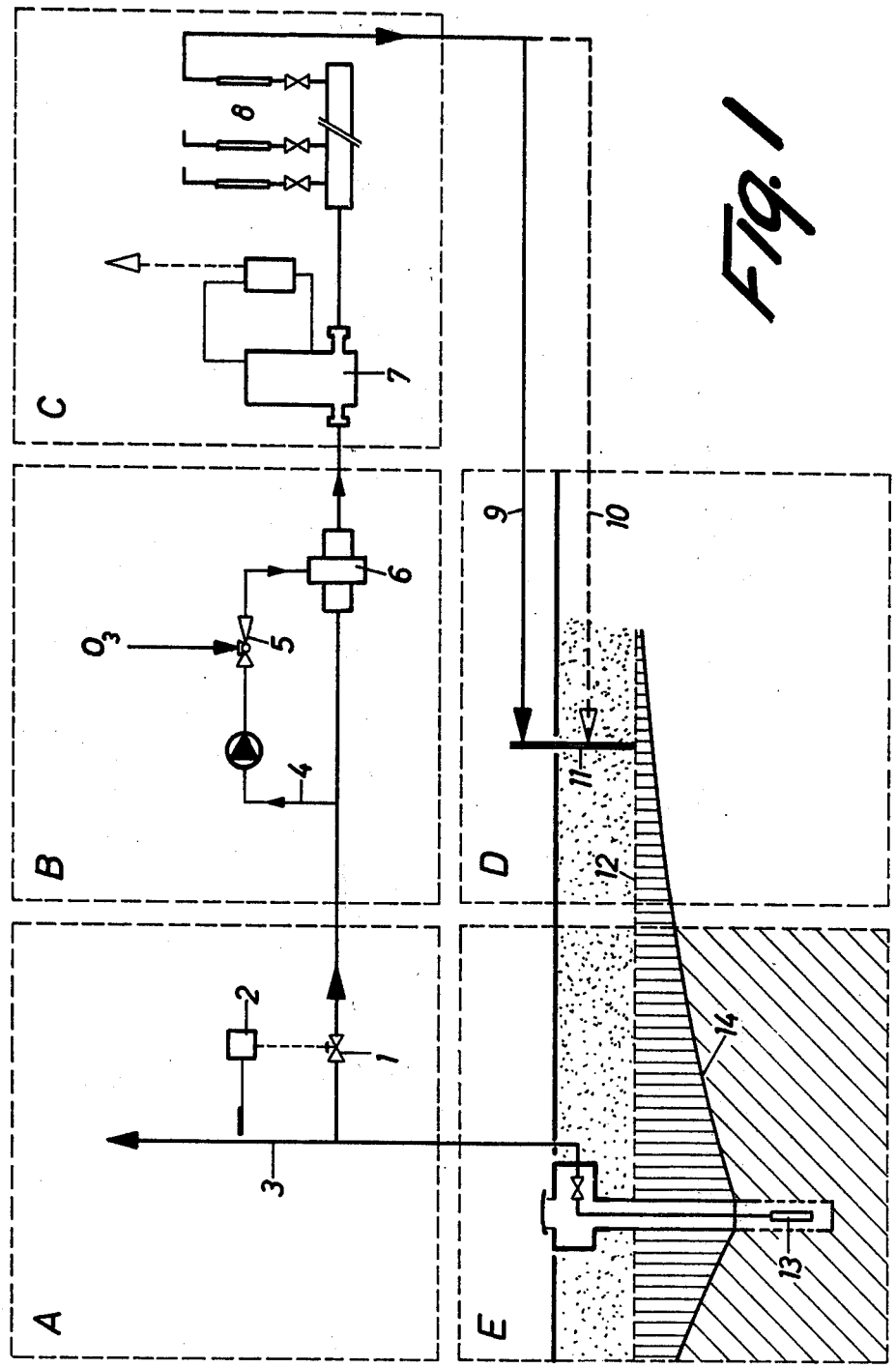
FIG. 1 of the drawings is a schematic illustration of the apparatus.

An illustrative form of the apparatus of the invention will be described in connection with the drawing.

In unit A there is represented the withdrawal apparatus 1. Its control can be provided by an automatic water analyzing apparatus 2. The withdrawal takes place from the main pressure line 3.

The block unit B contains the mixing apparatus, in the illustration an ozonization apparatus.

Ozone is led to the water in an ejector apparatus 5 in a by-pass line 4 and the components are intensively mixed in mixer 6.

In block unit C there are contained the degassing device 7 and the distributor 8.

The block unit D shows the conveying of the ozone containing water above ground as in supply conduit or line 9 or below ground as in supply conduit or line 10. The drainpipe 11 extends to the still water surface 12.

In block unit E finally there is illustrated the pumping station with pump 13, ground water reducing curve 14 in the pumping.

Figure 2:
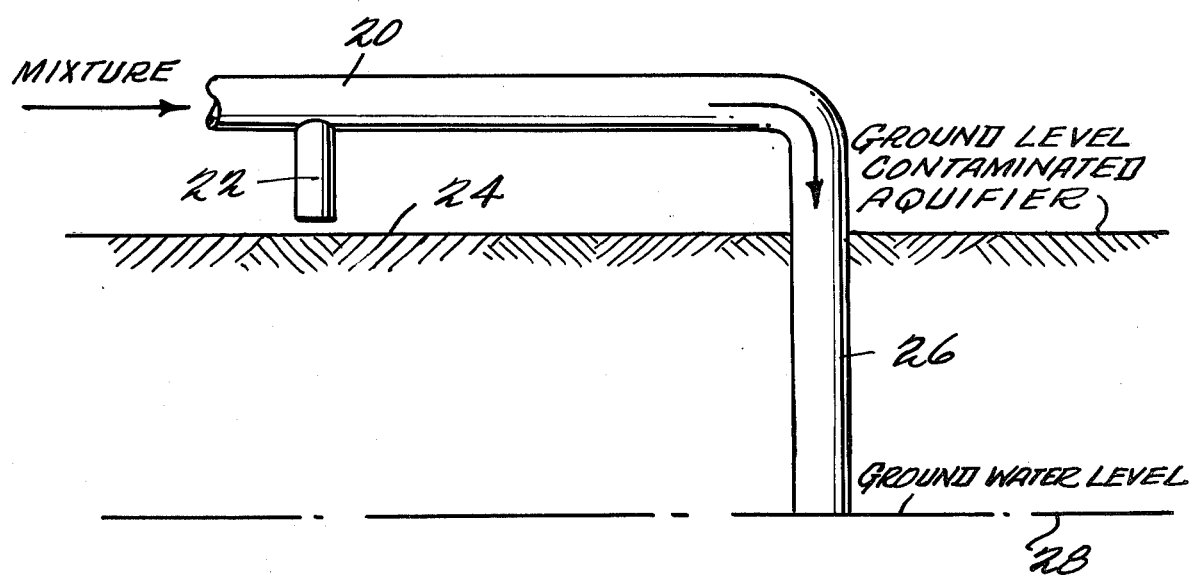
FIG. 2 shows one means for delivering decontaminating solution.

FIG. 2 shows a delivery apparatus adapted to deliver a portion of the water-oxidizer mixture above the surface of the earth and the remainder below the surface. As shown in FIG. 2, there is provided a supply conduit 20 for delivery of water-oxidizer mixture. A portion of the mixture enters pipe 22 where it is delivered above the surface 24 of the earth. The remainder of the water-oxidizer mixture goes from conduit 20 into pipe 26 which delivers the mixture below the surface of the earth, e.g. at the ground water level 28.

The following operating cases also serve to illustrate the invention.

DESCRIPTION OF THE PREFERRED EMBODIMENTS

Operating Case 1: Well S

Before the Treatment

Average Withdrawal—60 m$^3$/h water
Average Number of Germs—240 per ml
Average Germ Growth—38 per 100 ml

Treatment

By means of the apparatus of the invention 10 m$^3$/h of the water withdrawn was charged with 0.6 g/m$^3$ of ozone, degassed and again led over 12 drainage tubes which were arranged approximately concentrically around the bore of the well to the zone of protection.

After the Treatment

Average Withdrawal—60 m$^3$/h water
Average Number of Germs—2 per ml
Average Growth of Germs—14 per 100 ml

Operating Case 2: Well E

Before the Treatment

Oxygen Concentration—1.9 g/m$^3$
Degree of Saturation—18.2%

After the Treatment

Oxygen Concentration—5.1 g/m$^3$
Degree of Saturation—50.9%

Treatment

The well had a water supplying capacity of about 72 m$^3$/h. From this there was withdrawn on the average by the apparatus of the invention 7 to 8 m$^3$/h, i.e., about 10%, and this was charged with an average ozone content of 0.2 to 0.3 g/m$^3$ and again returned into the earth source. After about 4 months of treatment there was reached the conditions "After the Treatment". In this case also the drainage pipes were arranged concentrically around the bore of the well.

Operating Case 3: Well O

Before the Treatment

| | |
|---|---|
| Concentration of hydrocarbons in the region of the earth, i.e., in the water bearing ground layer | 170 g/metric ton of the earth region |

After the Treatment

| | |
|---|---|
| Concentration of hydrocarbons in the region of the earth, i.e., in the water bearing ground layer | 3.5 g/metric ton of the earth region |

Treatment

There was led to the earth source by means of the apparatus of the invention 12 m$^3$/h water with an average ozone content of 0.8 g/m$^3$. After about 3 months treatment there was reached the conditions "After the Treatment".

As the organic contaminants which can be removed by the process and apparatus of the invention there may be mentioned in a non-limiting sense aliphatic and aromatic hydrocarbons, e.g., gasoline, octane, benzene, naphthalene, petroleum, pesticides such as insecticides, e.g., dichlorodiphenyltrichloroethane, benzene hexachloride and phosphorus compounds, e.g., Parathion, Demeton, Malathion, DDVP and Guthion, herbicides, e.g., 2,4-dichlorophenoxyacetic acid, isopropyl-N-(m-chlorophenyl)carbamate, N-1-naphthylphthalamic acid, fungicides, e.g., Captan, dithiocarbamates, e.g., disodium ethylenebisdithiocarbamate.

The contaminating substance can also be one which is formed by chemical-physical secondary reactions from a primary organic source.

The mixing in the apparatus can be a physical mixing and there can be formed an emulsion or a solution. The oxidizing agent and/or bactericide frequently is gaseous, e.g., ozone or chlorine.

The apparatus can comprise, consist essentially of or consist of the equipment set forth and the process can comprise, consist essentially of or consist of the steps set forth with the materials recited.

The apparatus can be fixed in place or can be mobile. It can be installed on a transporter.

In the case of poor pumping water it is desirable to arrange the sprinking (or feed) lines and/or drainage lines concentrically around the bore of the well or shaft.

An example of the further use of the apparatus of the invention is to install the sprinking (or feed) lines and/or the drainage lines around a tank plant (tank farm), or an oil waste plant, or an oil refinery.

The sprinking (or feed) lines and/or drainage lines frequently are desirably arranged between an impure dammed up flow and the adjacent ground water carrying layers.

The sprinking (or feed) lines and/or drainage lines can also be installed between land segments fertilized with organic material containing fertilizers, e.g., manure or synthetic organic materials such as urea or urea-formaldehyde, and ground water carrying layers.

The supply conduits or delivering means can be arranged, for example, around the bore shaft of a ground water pump.

Also, the supply conduits or delivering means can be installed around an oil tank plant, an oil waste treatment plant or an oil refinery.

Likewise, the supply conduits and deliverying means can be installed either between an impure demmed up flow of water and adjacent ground water carrying layers or between a land segment treated with an organic fertilizer and ground water carrying layers.

What is claimed is:

1. An apparatus for the chemical decontamination of water containing layers of earth or water from a well, polluted with organic materials comprising the following units:

(1) a water pressure line, means for withdrawing from said water pressure line a portion of the water which portion is to be treated and returned to the layers of earth or said water well,
(2) supply means for a strong chemical oxidizing agent or bactericide, means for mixing said oxidizing agent or bactericide with said withdrawn water,
(3) degassing means for removal of excess gas from said water-oxidizer mixture,
(4) means for distributing said water-oxidizer mixture into a plurality of supply conduits, and
(5) means for delivering said water-oxidizer mixture from said supply conduits to said polluted layers or water well.

2. An apparatus according to claim 1 wherein the apparatus is used to decontaminate layers of earth and said delivering means delivers the water-oxidizer mixture at a point no lower than the still water level in said layers of earth.

3. An apparatus according to claim 2 wherein the delivering means is adapted to deliver at least a portion of the water-oxidizer mixture above the surface of the earth.

4. An apparatus according to claim 2 wherein the delivering means is adapted to deliver at least a portion of the water-oxidizer mixture below the surface of the earth.

5. An apparatus according to claim 2 wherein the delivering means is adapted to deliver a portion of the water-oxidizer mixture above the surface of the earth and another portion below the surface of the earth.

6. An apparatus according to claim 2 wherein said supply means for oxidizing agent or bactericide to be mixed with water includes an ozonider.

7. An apparatus according to claim 6 wherein said withdrawal means includes an automatic water analyzer and means for regulating the amount of water withdrawn or the amount of supply of oxidizing agent or bactericide to be mixed with water according to the analysis of the withdrawn water.

8. An apparatus according to claim 2 wherein the water pressure line includes a ground water pump and the apparatus is adapted to decontaminate the pump water and the ground water carrying layers.

9. A process for the chemical decontamination of water from a source which is water containing layers of earth comprising:
(1) withdrawing water from said source under pressure,
(2) treating a portion of said withdrawn water with a chemical oxidizing agent or bactericide,
(3) degassing said treated portion of withdrawn water to remove excess gas,
(4) distributing the degassing water into a plurality of supply conduits, and
(5) delivering said degassed water to said layers of earth.

10. The process of claim 9 wherein the water is withdrawn from layers of earth and is returned to said layers of earth at a point no lower than the level of still water.

11. The process of claim 10 wherein a portion of the water is returned above ground level and another portion of the water is returned below ground level.

12. The process of claim 9 wherein the chemical oxidizing agent or bactericide is ozone, a halogen or a silver salt.

13. The process of claim 12 wherein the chemical oxidizing agent or bactericide is ozone.

14. The process of claim 9 wherein the contaminating substance comprises an organic pesticide, hydrocarbon or other toxic compound.

15. The process of claim 14 wherein the contaminating substance comprises an aliphatic or aromatic hydrocarbon.

16. The process of claim 15 wherein the contaminating substance comprises petroleum.

17. The process of claim 14 wherein the contaminating substance is an insecticide.

18. The process of claim 9 wherein the oxidizing agent or bactericide is a gaseous oxidizing agent.

19. A process for the chemical decontamination of water from a source polluted with organic materials comprising:
(1) withdrawing water from said source under pressure,
(2) mixing a portion of said withdrawn water with a chemical oxidizing agent and/or bactericide,
(3) degassing said mixture,
(4) distributing the mixture into a plurality of supply conduits, and
(5) delivering said mixture to said polluted water source.

20. The process of claim 19 wherein the chemical oxidizing agent or bactericide is ozone containing oxygen a halogen or a silver salt.

21. The process of claim 20 wherein the chemical oxidizing agent or bactericide is ozone containing oxygen.

22. The process of claim 19 wherein the contaminating substance comprises an organic pesticide, hydrocarbon or other toxic compound.

23. The process of claim 22 wherein the contaminating substance comprises an aliphatic or aromatic hydrocarbon.

24. The process of claim 23 wherein the contaminating substance comprises petroleum.

25. The process of claim 22 wherein the contaminating substance is an insecticide.

26. The process of claim 19 wherein the oxidizing agent or bactericide is a gaseous oxidizing agent.

* * * * *